United States Patent [19]
Kammel et al.

[11] 4,159,235
[45] Jun. 26, 1979

[54] METHOD AND APPARATUS FOR TREATING METAL CONTAINING WASTE WATER

[75] Inventors: Roland Kammel; Hans-Wilhelm Lieber, both of Berlin, Fed. Rep. of Germany

[73] Assignee: Götzelmann KG, Stuttgart, Fed. Rep. of Germany

[21] Appl. No.: 911,812

[22] Filed: Jun. 2, 1978

Related U.S. Application Data

[62] Division of Ser. No. 854,004, Nov. 22, 1977, Pat. No. 4,123,340.

[30] Foreign Application Priority Data

Nov. 22, 1976 [DE] Fed. Rep. of Germany ....... 2652934

[51] Int. Cl.² .............................................. C02C 5/12
[52] U.S. Cl. ................................... 204/272; 204/1 R; 204/149; 204/152; 204/213
[58] Field of Search ............... 204/1 R, 149, 152, 213, 204/272

[56] References Cited

U.S. PATENT DOCUMENTS

| | | | |
|---|---|---|---|
| 2,390,282 | 12/1945 | Tour et al. | 204/213 X |
| 2,766,201 | 10/1956 | Luther | 204/213 |
| 2,797,194 | 6/1957 | Anderson et al. | 204/213 X |
| 3,966,571 | 6/1976 | Gagnon et al. | 204/1 R X |
| 4,072,596 | 2/1978 | Moeglich | 204/149 X |

FOREIGN PATENT DOCUMENTS 46691 5/1971 Australia.
114624 12/1975 German Democratic Rep.

*Primary Examiner*—Arthur C. Prescott
*Attorney, Agent, or Firm*—Spencer & Kaye

[57] ABSTRACT

Method for treating metal containing waste water employing a vessel containing the waste water in which there is provided at least one anode and a cathode consisting essentially of electrically conductive particles and in which the waste water is subjected to electrolysis during which the waste water and the particles of the cathode are being moved. The particles of the cathode are arranged in a cage closed on all sides whose walls are perforated. The cage is moved by an external force during the electrolysis in order to move the particles. The waste water is simultaneously moved by producing a forced flow through the particles. An apparatus is provided for practicing the method.

1 Claim, 2 Drawing Figures

METHOD AND APPARATUS FOR TREATING METAL CONTAINING WASTE WATER

CROSS REFERENCE TO RELATED APPLICATION

This application is a division of copending application Ser. No. 854,004, filed Nov. 22, 1977 now U.S. Pat. No. 4,123,340 issued Oct. 31, 1978.

BACKGROUND OF THE INVENTION

The present invention relates to a method for treating metal containing waste water while employing a vessel containing the waste water in which at least one anode and one cathode are disposed, the cathode consisting essentially of electrically conductive particles and in which the waste water is subjected to electrolysis during which the waste water and the cathode particles are being moved and to an apparatus for practicing the method. Such a method is disclosed in Australian Pat. No. 46,691.

Waste waters in the sense of the present invention are understood to mean all metal containing solutions obtained during technical processing. Such solutions are, for example, waste waters from mines, final liquors, wash waters, trickling waters, rinse waters from tanneries, electroplating operations, the manufacture of printed circuits, film developing, etc. Electrolytic processes have been in use for a long time for the recovery of metals from such solutions having a relatively high metal content, so-called concentrates and semiconcentrates. In this way, it is possible to directly cathodically separate a major portion of the metal content of such solutions. If the electrolysis is effected in baths having vertical electrodes, final concentrations of about 8 to 1 g/l are attained, depending on the electrochemical properties of the metals to be separated, the bath composition and the content of additives. However, with such metal contents of 8 to 1 g/l, the current yield is already greatly reduced and further reduction in the metal concentration of the solutions is practically unattainable with this mode of operation. The then remaining solutions cannot be economically processed with the aid of ion exchangers, since the requirement for regenerating chemicals for the ion exchanger would be unduly high and the resulting heavy salting of the waste water would constitute an additional stress on the environment.

In order to further reduce the residual metal content in the solution, it has often been proposed to improve the cathodic deposition conditions. Such proposals are essentially directed to reducing the depletion of the electrolyte of depositable metal ions in the region of the cathode. Thus, various types of electrolytic cells are known which contain spatially fixed, firmly contacted, quasi two-dimensional electrodes which are frequently arranged vertically, but which can also have another orientation. A relative movement of the electrodes with respect to the electrolyte serves to improve deposition conditions.

Movement of the electrodes can be realized by vibration. The electrodes may be designed to have a disc, ring or cylindrical shape, and may be rotated in the electrolyte. Further, the exterior configuration of the electrodes may contribute to the fact that the electrolyte flows against the electrode surface at high speed and, if possible, not merely in a laminar manner. The electrolyte may also be pumped through channel type electrolysis cells, may flow vertically through concentrically arranged electrodes with gases being blown in simultaneously. The vertical movement of the liquid may be so intensive that glass beads or other particles of various materials are stirred up and improve the mass transfer at the vertical electrodes.

In order to realize a higher space-time yield during electrolytic processes, numerous efforts have been directed at building up three-dimensional electrodes from electrically conductive bulk material. Such particle piles are called fixed beds if the relative movement with respect to the electrolyte is effected by passing the electrolyte through the bed, either in the direction of the electric field lines or normally thereto.

It is also known to improve conditions for deposition of metals from concentrates and semiconcentrates by not only moving the electrolyte relative to the bulk of the cathode, but simultaneously moving the bed itself. According to East German Pat. No. 114,624, the pile of particles is moved by disposing the particles in a container having a perforated bottom, and rotating the container about an axis which is inclined with respect to the horizontal. During the rotation, the electrolyte flows through the pile. In such a method, the anode can be disposed not only above, but also below the cathode pile. As has been found in practice, this process is suited only for processing concentrates and semiconcentrates and has the above-described drawbacks.

Australian Pat. No. 46,691 discloses a process as described above. At least one stirrer is provided to move the cathode pile. The stirrer mechanically moves the particle pile at the bottom of the container through which the electrolyte flows. In this process, the anode may also be constituted by electrically conductive particles and is disposed above the cathode pile. Although the pile cathode in this known process is agitated, under simultaneous movement of the electrolyte, so that the particles are continuously and circulatingly moved, this process is possible only for treating concentrates and semiconcentrates and it has so far not been possible in practice to reduce the metal concentration of the waste water to a residual content of about 1 g/l because the pile cathode has dead spaces and potential free zones in which the electrolytically deposited metal is chemically redissolved in part.

All of the above-described processes and apparatuses are suitable for the electrolytic processing of concentrates and semiconcentrates, particularly if these substances are returned to the process after the electrolytic treatment because under such conditions it is not necessary to realize essential demetallization. The above-described cells with a moving cathodic particle fill can be used only to deposit electropositive metals such as silver, copper and bismuth. This is so, inter alia, because of the low surface-volume ratio of the cathodic particle fill and because of larger field-free interiors in the same where electronegative metals are redissolved by the electrolyte.

In all of the known processes for the electrolytic recovery of metal from concentrates and semiconcentrates, at sufficiently high current efficiencies the end result is a solution with a metal content around 1 g/l. If these metals cannot be returned to the process, the remainder of the metal ions is precipitated in a conventional manner by raising the pH and the slurry is dewatered and the metal containing residue is discharged.

Attempts have also been made to process such diluted rinse waters directly electrolytically. If a cathodic particle pile is used for this purpose and the waste water is passed through this pile from the bottom of the cell vertically upwardly at such a high speed that a turbulent (fluidized) bed is produced, this brings about a large cathodic surface and the conditions for a cathodic deposition of metal ions from solutions having concentrations of less than 1 g/l are much improved. In small experimental diaphragm containing cells, such a mode of operation has yielded residual content of copper and silver in the solution of about 1 mg/l. The technical use of a fluidized bed electrolysis is made difficult, however, by apparatus problems. The low conductivity of diluted waste waters in conjunction with a diaphragm leads to a high voltage requirement. Further, the diaphragm easily becomes clogged, for example, by metal deposited thereon. A change in particle size also results in a change of the kinematics of the fluidized particles and contacting the fluidized bed is fraught with problems.

The electrolytic recovery of metals from concentrates and semiconcentrates thus is considered state of the art "while the direct electrolytic processing of diluted rinse waters is out of the question." See, R. Weiner: Die Abwässer der Gavanotechnik und Metallindustrie [in translation, The Waste Waters of the Electroplating Art and Metal Industry] 4th Edition, 1973, page 210, published by Eugen G. Leuze Verlag, Saulgau. For this reason, diluted waste waters today are not treated electrolytically, but chemically, either directly or after enrichment. After decontamination, the waste water is subjected to neutralization so that the majority of the metal ions are precipitated out. The waste water is then clarified and drained in a sewer. The remaining mud (sludge) is thickened, dewatered and discharged. Such process is economically unjustifiable and untenable in the long run because of the effect on the environment.

SUMMARY OF THE INVENTION

It is an object of the present invention to provide a method for treating metal containing waste waters with which it is possible in a simple, practically continuous manner to attain almost complete recovery of the metals contained in the waste waters in a safe manner so that no metal containing muds (sludge) are produced and the treated waste waters can be subsequently discharged directly.

A further object of the present invention is to provide an apparatus for treating metal containing waste waters.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a method for treating metal containing waste water employing a vessel containing the waste water in which there is provided at least one anode and a cathode consisting essentially of electrically conductive particles and in which the waste water is subjected to electrolysis during which the waste water and the particles are being moved, comprising: arranging the particles of the cathode in a cage closed on all sides, moving the cage by an external force during the electrolysis in order to move the particles, and simultaneously moving the waste water by producing a forced flow through the particles.

With such a process it is possible, as has been proven in practice, to almost completely demetallize metal-containing waste waters, where the metals are recovered without the use of chemicals in a form enabling them to be reused directly. The process according to the invention can be used with great advantage, particularly where known processes have already failed, i.e., with diluted, but still metal-containing waste waters. During the electrolysis of the present invention, there also occurs substantial decontamination of the waste water, e.g., by oxidation of cyanides for which likewise no additional chemicals are required.

In another aspect of the present invention, apparatus is provided for treating metal containing waste water employing a vessel containing the waste water in which there is provided at least one anode and a cathode consisting essentially of electrically conductive particles and in which the waste water is subjected to electrolysis during which the waste water and the particles of the cathode are moved, comprising: a vessel to accommodate metal containing waste water; a cage disposed in the vessel, the cage having perforated walls and being movable by external forces; a large number of electrically conductive particles disposed in the cage; and a pump which is part of a closed circuit for the waste water connected to the vessel.

In order to obtain a cathode with a good ratio of surface to particle volume and to prevent potential free interstices in the cathodic particle pile, a tubular, double walled cage can be used to accommodate the particle fill. If this cage is rotated clockwise or counterclockwise, moved suddenly or tumbled or caused to vibrate, the relative movement of the particles in conjunction with the forced flow of the waste water produces particularly favorable deposition conditions for metals, even from diluted waste waters. The thus attainable intensive mass transfer permits the use of high electrolysis current.

It is to be understood that both the foregoing general description and the following detailed description are exemplary, but are not restrictive of the invention.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

DETAILED DESCRIPTION OF THE INVENTION

Figure 1:
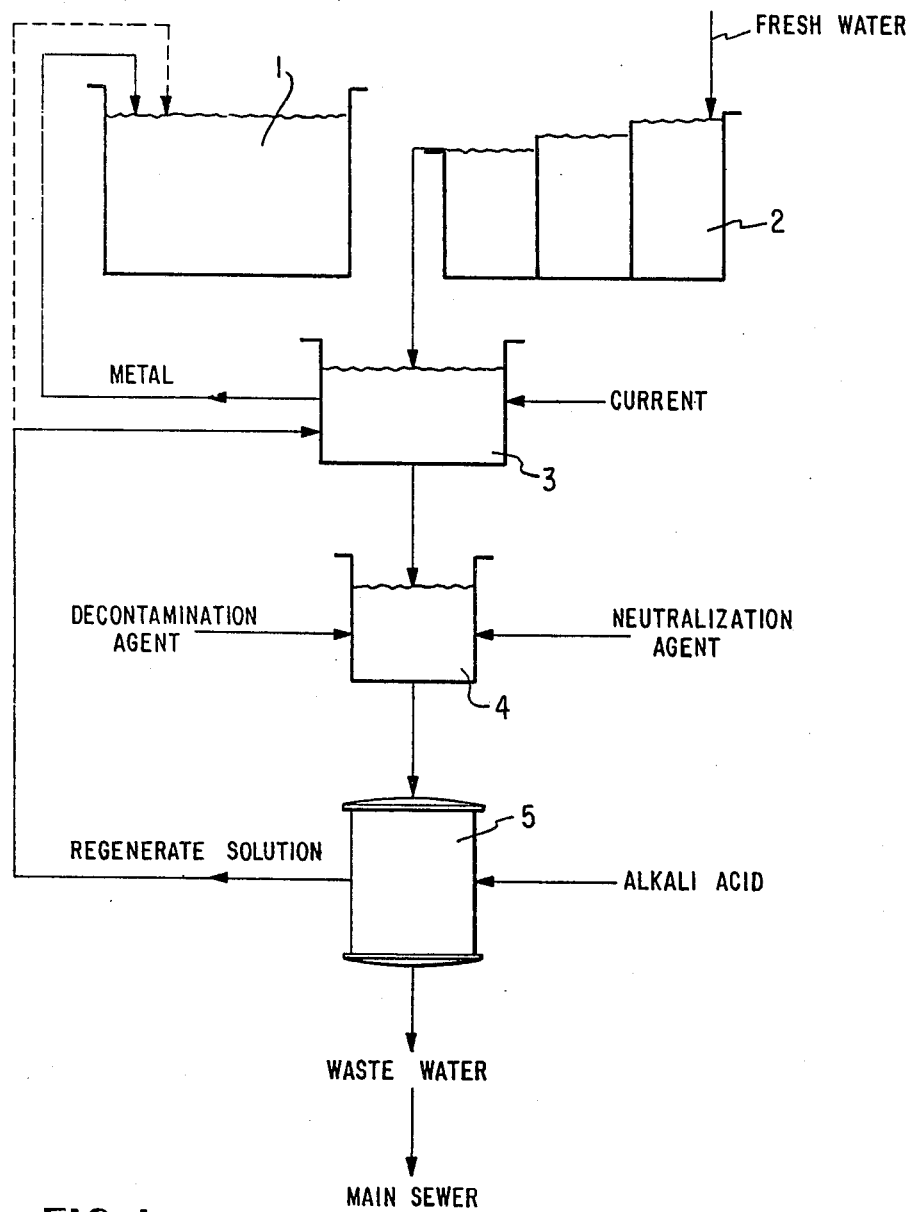
FIG. 1 is a schematic representation of the use of the waste water treating process according to the present invention in conjunction with an electroplating process which is producing the waste water.

The electrolytic demetallization process of the present invention makes it possible to almost completely demetallize metal-containing waste waters. Thus, it is possible to treat diluted solutions containing for example, about 1 gram of metal per liter to obtain an electrolytically demetallized waste-water containing a few mg of metal per liter, and even as little as about 1 mg/l.

Electrolytic demetallization of the waste water down to a few mg/l, however, is not always necessary, and accordingly it is sufficient in some cases to practice the method of the present invention in a not quite so optimum manner, if the metal content of the waste water needs to be reduced only to such an extent that the remainder of the metal can be removed simply and economically by ion exchange. Complete decontamination and preneutralization of the substantially demetallized waste waters requires only small quantities of chemicals which coincide with the theoretically required amounts. Due to the substantially electrolytic demetallization of the waste water, only a small system capacity is required for the removal of the remainder of the metals, e.g. by means of a fixed bed ion exchanger. The solutions rich in metals which develop during regeneration of the ion exchanger can be selectively returned to the process in which the waste waters were produced or into the electrolytic metal recovery system.

By completely separating the metals from the waste waters by means of the process according to the present invention—without subsequent ion exchange or, when the process is practiced less intensively, with subsequent ion exchange—clarification and filtration of the waste waters are no longer necessary, no sludge is produced, there are no transporting problems and finally in this mode of operation there is no discharge of sludges with its environmental problems.

The arrangement of the cathodic particle bed in a cage that is perforated all around produces improved field distribution in the particle bed so that the process according to the present invention is capable of separating not only electropositive metals, such as gold, silver, copper or bismuth, but also, for example, nickel, cadmium, and zinc from diluted waste waters down to very low residual contents. The dimensions and the configuration of the cage are advisably selected so that the particle bed is sufficiently peripheral and has only a small bed thickness in which potential free zones are prevented. Thus, the electrolytic treatment of diluted, metal containing waste waters can be used over a broad field of applications and the sludge problem connected with the processing of waste waters can be solved in an environmentally advantageous, and at the same time, economical manner with respect to all poisonous heavy metals contained therein.

A cage with a particle bed as described above may, for example, consist of two perforated tubes of different diameters d and D which are perforated, and the tube with the smaller diameter is shored into the greater tube. On both sides the front faces are closed. The space between the two tubes is filled with particles up to about 85%, so that the particles are agitated when the tubes are rotated about their axis. In order to obtain a good ratio of surface to particle volume and to prevent potential free interstices in the cathodic particle bed, the tubular, double walled cage is used to accomodate the particle fill. When the difference of the diameters d and D is, e.g., 4 cm, the "thickness" of the bed is only 2 cm, and the particle bed "is very peripheral." When D is 30 cm and d is 26 cm, and when the tubes are 40 cm long, the inner and outer peripheral areas are about 7000 cm$^2$ and the volume of the particle bed is about 7 liter, and the peripheral area is of about 1000 cm$^2$ per liter of particle volume. Because the contact surface of the particles is very small the true peripheral area is much larger and is depending on the particle size.

In the prior art particle cathodes, be they moved mechanically or as a fluidised bed, the metal is deposited on the particles whose size increases and the particles need be exchanged at regular intervals. In the process according to the present invention, however, the volume of the conductive particles of the cathode is set in relation to the volume of the cage so that these particles are periodically subjected to a falling movement. In this way, it is accomplished that the metal deposit peels or flakes off from the particles and falls through the perforations of the moving cage onto the bottom of the vessel or onto a collection device, such as a trough or the like, disposed in the vessel. This effect can be improved if the conductive particles are mixed with chemically and electrochemically inert bulk material. When the inert particles are small, there is achieved a high surface pressure when the particles are in contact which improves peeling of the deposit. Inert particles can be mixed between the electrically conductive particles only in such a small portion, e. g. 20 percent by volume, that good electrical contact of the particles is secured. Inert particles can be, for example, glass beads, grit, plastic grains, random shaped granite particles and abrasive chips of various shapes. The peeled or flaked off parts can be removed hydraulically or mechanically from the vessel bottom or from the collecting device which is disposed in the vessel. In this way, it is possible to realize continuous metal discharge and in this form the metal can be handled with particular ease.

The forced flow of the waste water can be produced, for example, by means of a pump which sucks the waste water through the cathodic particle bed. According to a further embodiment of the present invention, the waste water can here be circulated between the waste vessel and a reservoir whose dimensions are adapted to the operational conditions. The stream of waste water can here be conducted, either as a whole or in a partial stream, so that the peeled or flaked off metal particles originating from the cathodic pile accumulate at one point or several points on the bottom of the vessel or of the collecting device from where they can be removed from the vessel. These collecting points are spatially arranged so that the metal particles disposed at these points cannot act as intermediate conductors because otherwise complete demetallization of the waste water could not be attained.

The electrolysis current causes heating of the waste water. This increases the electrical conductivity of the water and thus lowers the energy requirement so that a constant temperature develops whose level depends on the current load in the waste water. When electronegative metals, such as cadmium and zinc, are deposited, it is of advantage to cool the waste water in order to prevent the hydrogen overvoltage from dropping. Cooling can be effected particularly advantageously by blowing air into the reservoir. In this way, the oxygen content of the waste water is reduced simultaneously and thus the cathodic current yield increases.

Referring now to FIG. 1, there is shown an electroplating bath 1 in which workpieces are treated. The treated workpieces are subsequently rinsed three times in a rinsing cascade 2. Instead of the rinsing cascade 2, or in addition thereto, any other rinsing system suited for increasing concentration can be used. Waste water overflows from rinsing cascade 2 and is substantially demetallized with the aid of a demetallization device 3, explained in greater detail hereinafter. Waste water leaving demetallization device 3 can then be conducted into a decontamination and preneutralization vessel 4 in which, for example, the remaining cyanide in the waste water is oxidized and the pH of the waste water is set to be weakly acid. Thereafter, the waste water can be passed through an ion exchanger 5 which it leaves completely demetallized.

In the demetallization device 3, the majority of the metals contained in the waste water are cathodically deposited by the electrolysis current and are thus metallically recovered so that the metals can be reused in the electroplating bath 1. The substantially demetallized waste water can, if required, be decontaminated and preneutralized in the decontamination and preneutralization vessel 4 by the addition of decontamination and neutralization agents. It is then conducted through the ion exchanger 5 and reaches the main canal (sewer) in a demetallized, decontaminated state and with neutral pH. The ion exchanger 5 is regenerated with an acid and/or base and the soluton, rich in metals, which develops during the regeneration, is returned to the demetallization device 3 or, if possible, to the electroplating bath 1.

Figure 2:
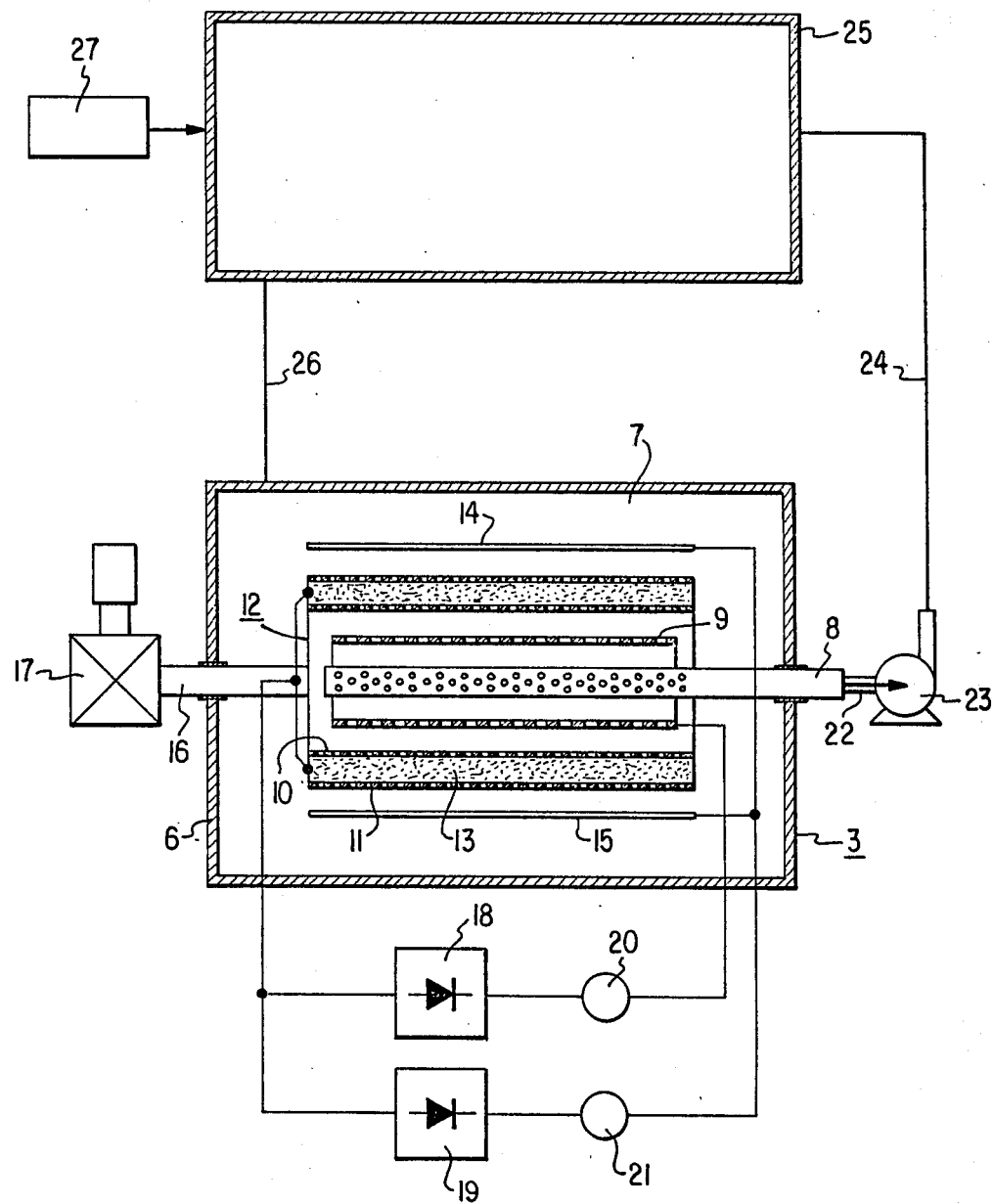
FIG. 2 is a schematic top view of an apparatus for the electrolytic deposition of metals from diluted waste waters in accordance with the teachings of the present invention.

An embodiment of a demetallization device 3 suitable for practicing the method according to the invention is shown to a larger scale in FIG. 2.

A vessel 6 is indicated schematically as the vessel in which is disposed the waste water 7 to be demetallized. A pipe 8 is further arranged in vessel 6 in horizontal position and is provided with perforations over a wide region. In this perforated region, a piece of pipe 9 which, for example, is made of an expanded metal, is arranged concentrically around pipe 8. Concentrically arranged around pipe 9 are two perforated pipes 10 and 11 which may be made of plastic grids. Pipe 11 has a larger diameter than pipe 10 and together pipes 10 and 11 form a cage 12 to accommodate the cathode of electrically conductive particles 13. The particles may be metal particles or particles of nonconductive material with a metal coating, such as, for example, a metalized granulate containing an acrylonitile-butadiene-styrene graft polymer as the core of the granulate. The interstices between the pipes 10 and 11 are filled, for example, to 85% with particles 13. On both sides of the cage 12, anodes 14 and 15 are arranged. Cage 12 is caused to rotate via a shaft 16. A geared motor 17 serves as the drive.

Two rectifiers 18 and 19, with variable direct voltage, are provided for the electrolytic demetallization. The particles 13 disposed in the space between pipes 10 and 11 are connected to serve as cathode. The pipe 9 of expanded metal is connected to serve as an internal anode, and the current from the internal circuit is indicated at ammeter 20. The current from external anodes 14 and 15 is set with the aid of ammeter 21. Pipe 8 has one end protruding out of vessel 6 and connected to a pump 23 via line 22. Pump 23 can directly or indirectly convey the waste water 7 back to vessel 6.

In starting the operation of demetallization device 3, pump 23 is first switched on to suck the waste water 7 from outside through the bulk cathode and thus through the interstices between particles 13 and the expanded metal pipe 9 and returns it directly or indirectly into vessel 6. Thereafter, the cage 12, comprising pipes 10 and 11, is caused to rotate with the aid of geared motor 17. Now the two rectifiers 18 and 19 are switched on. The current density of the internal circuit, including anode 9 and the cathode, as well as the current density of the external circuit including anodes 14 and 15 and the cathode, can be set separately via ammeters 20 and 21.

Although it is sufficient, in principle, for the waste water to be returned directly to vessel 6 by pump 23, it can initially be pumped, according to a further feature of the present invention, through a line 24 into reservoir 25 from where it reaches vessel 6 back through a line 26. Instead of a separate reservoir 25, it is also possible to use a rinsing vessel, for example, rinsing cascade 2, as the means for returning the waste water to vessel 6. The size of reservoir 25 depends on the volume of the waste water to be treated. Cooling air can be blown into reservoir 25 by means of system 27, so that it is easy to set a uniform temperature for the waste water which is of advantage for certain metals. With the blown-in cooling air which is extracted again from the reservoir, it is simultaneously possible to drive oxygen out of the waste water.

In addition to the mode of operation for cage 12 of the cathode shown in FIG. 2, other ways of moving the particles are likewise possible. Thus, the perforated cage 12 can also be caused to perform a tumbling movement or to vibrate. The shape of cage 12 per se is also arbitrary. It must only be assured that all walls of the cage are perforated so that no damaging potential-free zones are created between the particles 12 and metal parts which peel away from the deposited layers can leave cage 12 and accumulate at the bottom of vessel 6 or in the collecting device. For this purpose, it is advisable to design the bottom of the vessel as a whole to be slanted in the direction toward a point, or to provide oblique recesses at several points, or to provide the collecting device with such oblique recesses, respectively, or to support it by vibration or other mechanical influences in the removal of the metal. From these collecting points, the metal parts are then removed at intervals, for example, hydraulically or mechanically.

In the embodiment of the apparatus shown in FIG. 2, the forced flow of the waste water is produced by pump 23 which forcibly sucks the waste water through pipe 8 and through particles 13. It has been found that the process according to the present invention is particularly effective if the forced flow is indeed generated by sucking the waste water through the particles 13 of the cathode. However, the process can also be used if the waste water is pumped through the particles, for which is would suffice to reverse the effective direction of pump 23.

The following examples are given by way of illustration to further explain the principles of the invention. These examples are merely illustrative and are not to be understood as limiting the scope and underlying principles of the invention in any way. All percentages referred to herein are by weight unless otherwise indicated. Three examples will now be given for practicing the method of the invention with certain metals:

EXAMPLE 1

Waste water containing 1340 mg/l silver and 8200 mg/l potassium cyanide is desilvered in demetallization device 3. The anodes 14, 15, and 9 are made of steel. Copper discs serve as the particles 13 for the cathode. The waste water is pumped with a pump output of 3 liters per second. The external circuit containing anodes 14 and 15 is set to 80 A and the internal circuit containing anode 9 to 20 A. The waste water temperature rises to about 27° C. The electrolysis is terminated with a silver content of the waste water of 0.98 mg/l. At the end of the electrolysis, the potassium cyanide content has dropped to 3450 mg/l. The desilvered waste water with a pH of about 11.9 is decontaminated in vessel 4 through the careful addition of sodium hypochlorite, is neutralized to a pH of 7.8 with hydrochloric acid and discharged.

EXAMPLE 2

Waste water containing 1242 mg/l cadmium with a pH of about 2.0 is treated in demetallization device 3. The anodes 14, 15 and 9 are made of lead. Aluminum discs serve as the particles for the cathode. The waste water is pumped with a pump output of 3 liters per second. The external circuit containing anodes 14 and 15 is set to 83 A and the internal circuit containing anode 9 to 27 A. The waste water temperature rises to about 37.8° C. The electrolysis is terminated with a cadmium content of 320 mg/l in the waste water. The thus treated waste water is preneutralized to a pH of 5.2 in a vessel 4 by the addition of sodium hydroxide solution. Thereafter, it is charged into ion exchanger 5 which contains a weakly acid ion exchanger resin of the iminodiacetate type in sodium form. The waste water leaves ion exchanger 5 with a content of about 0.2 mg/l cadmium and a pH of about 6.9. The ion exchanger resin is regenerated with sulfuric acid. The solution which develops during the regeneration with sulfuric acid has a cadmium content of about 18 g/l and is fed into the demetallization device 3.

EXAMPLE 3

Waste water containing 1200 mg/l zinc as zincate and about 13 g/l sodium hydroxide solution is treated in the demetallization device 3. The anodes 14, 15 and 9 are made of steel sheet metal. Steel pins serve as the particles 13 for the cathode. The waste water is pumped with a pump output of about 1.5 liters per second. The external circuit containing anodes 14 and 15 is set to 80 A and the internal circuit containing anode 9 to 20 A. The waste water temperature rises to 26.5° C. The electrolysis is completed with a zinc content of 33 mg/l in the waste water. The thus treated waste water is conducted into vessel 4. There, the alkaline waste water is neutralized with hydrochloric acid and weakly acidified until the zinc precipitated as hydroxide just begins to dissolve again. The waste water with a pH set at 5.4 is now extracted via ion exchanger 5 which it leaves in a neutral state. A weakly acid resin of the iminodiacetate type in sodium form is used as exchanger resin. Diluted sulfuric acid serves to regenerate the ion exchanger. The solution which develops during regeneration is preneutralized with sodium hydroxide solution and fed to demetallization device 3.

To complete the method of the invention described in the above mentioned examples and for further clarification serve the following typical operation conditions:

When a cage of 30 cm diameter and 40 cm length is used, the vessel has a volume of 100 liters and the reservoir containes 300 liters. The pump has a capacity of 2 liters per second. About 1 liter per second has been conveyed to the reservoir from which the waste water is recirculated to the vessel by an overflow. The electrolytic treatment is performed for several hours depending from the initial concentration and the desired end concentration, e.g. for 10 hours to reduce the zinc content according to example 3 of the application. The total current applied has been about 100 amperes. So there are used 400 liters of waste water and a pump capacity of about 2 liters per second, and the waste water in this way has been sucked through the cathodic particle bed about 18 times per hour. The temperature of the waste water has been risen up to about 32° C., and during the last 3 hours per minute about 0,5 m³ of air are blown into the reservoir from the bottom of the container through a framework of plastic, immersed into the water. In this way the level of the reservoir was lifted a little until there had been a new balance between the levels in the vessel and the reservoir.

In this example of a typical operation the amount of fill was 6 liters of particles, the cage volume was 7 liters, the size of the steel pins was about 8 mm long and 4 mm thick, the diameter of the perforation of the cage was 3 mm, the cage was rotated with 1 rotation in about 4 seconds, its peripheral area was about 7000 cm², the bed thickness was 2 cm, the anodes consisted of steel.

The starting concentrations are depending from the type of waste water the metal of which is to be recovered. Commonly used electrolytic cells with vertical electrodes are suitable for solutions with metal contents of about 10 g/l and more. If the mass transfer at the vertical electrodes is improved by measures described in this application, electrolytic treatment can bring about lower concentrations, but for very low concentrations only the fluidised bed cell has been suitable.

With the method of this invention solutions are treated which contain metals in such a concentration that they cannot be recovered by other electrolytic cells. That means, the metal content may be 1 or several grams per liter or even only several hundred milligrams per liter, e.g. in gold or silver recovery.

The desired final concentration depends on the amount of waste water. If the capacity of the cell is large enough and the use of an ion exchanger is to be avoided, the concentration can be as low as 0,5 mg/l, e.g. in gold, copper or silver recovery. If large amounts of waste water are to be treated, a calculation can be made for the most economic concentration which influences the capacity of the electrolytic cell as well as the capacity of the ion exchange column. Moreover, if the conductivity of the waste water is too small, additions of solutions produced by regenerating the ion exchange resin can be advantageous. In many cases, 50 or 500 mg/l can be desirable as final concentrations, in some cases the final concentrations are markedly lower.

The water can be sucked or pumped through the cathodic particle bed. To realise both methods, it is possible to reverse the direction of flow af the waste water at least once during the process.

A reversal during the process can consist e.g. of pumping the waste water through the particle bed during the first 80% of electrolysis time and sucking it during the rest of the time, when the concentrations are markedly lower.

It will be understood that the above description of the present invention is susceptible to various modifications, changes and adaptations, and the same are intended to be comprehended within the meaning and range of equivalents of the appended claims.

What is claimed is:

1. Apparatus for treating metal containing waste water employing a vessel containing the waste water in which there is provided at least one anode and a cathode consisting essentially of electrically conductive particles and in which the waste water is subjected to electrolysis during which the waste water and the particles of the cathode are being moved, comprising:

a vessel to accommodate metal containing waste water;

a cage in the form of a double-walled, tubular container disposed in the vessel, said cage having perforated walls and being movable by an external force;

a large number of electrically conductive particles disposed in said cage;

a pump, which is part of a closed circulation circuit for the waste water, connected to said vessel; and a pipe extending into said container and being connected to said pump, said pipe being provided with perforations in the region of said cage.

* * * * *